United States Patent

Floyd

[15] 3,645,400
[45] Feb. 29, 1972

[54] SELF-CLEANING FILTER APPARATUS

[72] Inventor: Terence John Floyd, 66 Wrottesley Road, Tettenhall, Wolverhampton, Staffordshire, England

[22] Filed: Aug. 28, 1970

[21] Appl. No.: 67,782

Related U.S. Application Data

[63] Continuation-in-part of Ser. No. 764,517, Oct. 2, 1968, abandoned.

[52] U.S. Cl..............................................210/108, 210/333
[51] Int. Cl.......................................................B01d 29/38
[58] Field of Search..................210/101, 108, 132, 137, 340, 210/341, 333

[56] References Cited

UNITED STATES PATENTS

| 767,808 | 8/1904 | Forbes | 210/340 X |
| 844,438 | 2/1907 | Bayley | 210/341 X |
| 975,483 | 11/1910 | Turek | 210/340 |
| 2,980,256 | 4/1961 | Nash | 210/333 X |
| 3,221,888 | 12/1965 | Muller | 210/333 |
| 3,397,784 | 8/1968 | Carr | 210/132 X |

FOREIGN PATENTS OR APPLICATIONS

| 18,716 | 9/1909 | Great Britain | 210/333 |

Primary Examiner—John Adee
Attorney—Norris & Bateman

[57] ABSTRACT

In a multiunit filter apparatus for removing solid particulate matter from a flowing fluid, automatic cleaning of the filter units is effected without employing valves and without interrupting the flow of fluid to be filtered, by connecting the filter units in parallel between a common inlet and outlet and forming the inlet as a multistable diverter of the coanda-type which periodically switches the incoming fluid from one filter unit to another and creates a reverse flow of fluid through a filter unit from which the incoming flow has been temporarily switched.

5 Claims, 2 Drawing Figures

PATENTED FEB 29 1972

3,645,400

INVENTOR
TERENCE J. FLOYD

BY Norris & Bateman
ATTORNEYS

SELF-CLEANING FILTER APPARATUS

This is a continuation-in-part of my copending application Ser. No. 764,517 filed Oct. 2, 1968 now abandoned for Filter Apparatus.

The invention relates to multiunit filter apparatus for removing solid particulate matter from flowing fluids and contemplates apparatus in which automatic self-cleaning of the filter units can take place without employing external energy or externally operated valves and without suspending operation of the apparatus.

More specifically the invention contemplates apparatus comprising two fluid passages each containing a filter unit and connected in parallel between an upstream junction connected to an inlet for fluid to be filtered and a downstream junction connected to an outlet for filtered fluid, wherein said upstream junction of said passages takes the form of a fluid switching device which is operable to direct fluid to be filtered from the inlet through one of said passages and to create a reverse flow of filtered fluid from the downstream junction through the other of said passages to clean the filter unit therein and is also operable in response to an increase in pressure in said one passage due to partial clogging of the filter unit therein, to switch the flow of fluid to be filtered to said other passage and create a reverse flow of filtered fluid from said downstream junction through said one passage to clean the filter unit therein.

PREFERRED EMBODIMENT

Figures 1, 2:
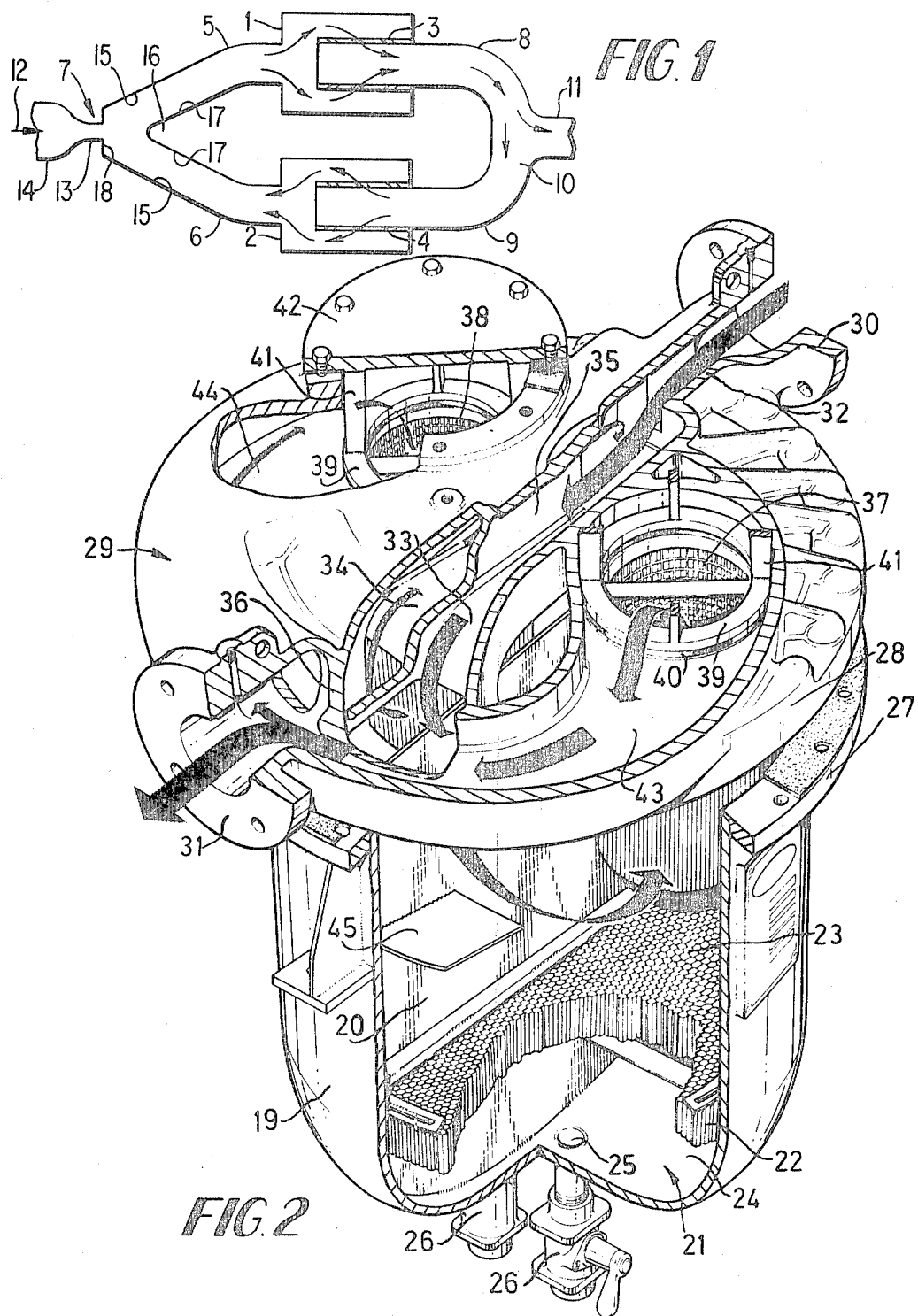
FIG. 1 is a diagrammatic drawing illustrating the principle of operation of the invention.
FIG. 2 is a perspective view of a preferred form of filter apparatus constructed in accordance with the invention, with parts broken away for better understanding of its operation.

Referring to FIG. 1, two filter units 1, 2 containing filter elements 3,4 respectively are connected by fluid passages 5,6 respectively to a diverter 7 comprising a nozzle 13 connected to an inlet conduit 14, sidewalls 15 formed by the outer walls of the passages 5 and 6 and a flow divider 16 separating the passages 5 and 6 and having walls 17 forming the inner walls of said passages and extending parallel to the outer walls 15. The filter units 1,2 are also connected by fluid passages 8,9 respectively to a confluence 10 leading to a fluid outlet passage 11.

In operation, fluid to be filtered passes through the inlet conduit 14 in the direction of the arrow 12 and is directed by the nozzle 13 into the interaction region between the sidewalls 15 and becomes attached, due to boundary layer effects, to one of the sidewalls 15 and thus flows through the passage 5 bounded by said wall. Given a symmetrical arrangement of the nozzle 13, sidewalls 15 and divider 16, the initial direction of attachment is arbitrary and given constant pressure conditions downstream of the interaction region the fluid will remain attached to its chosen wall. The strength of attachment of the fluid stream to its chosen sidewall 15 depends, among other things, upon the width of the end wall 18 connecting said wall 15 to the nozzle 13, the angle made by said end wall 18 with said sidewall 15 and the distance of the end of the divider 16 from the nozzle 13.

Assuming, for the purposes of explanation, that the fluid to be filtered first flows through passage 5 and filter unit 1, as indicated by the arrows, any solid matter in the fluid will collect on the outside of filter element 3 while the filtered fluid will flow on through passage 8 to the confluence 10 where it undergoes a substantial change of direction before entering the outlet passage 11. This change of direction creates a pressure in the passage 9, while the fluid flowing from the diverter 7 to the passage 5 creates a suction in the passage 6 and this pressure and suction combine to produce a reverse flow of filtered fluid through the filter unit 2, as indicated by the arrows, as a result of which, solid matter adhering to the surface of the filter element 4 is displaced and falls to the bottom of the filter unit. With continued flow of fluid to be filtered through the passage 5, the gradual buildup of solid matter on the surface of filter element 3 creates an increasing back pressure in the passage 5 which eventually overcomes the influence of the diverter 7 and succeeds in switching the flow of fluid to be filtered into passage 6 and thus through the filter unit 2, whilst a reverse flow of filtered fluid, created in the above-mentioned manner, passes through the filter unit 1.

In the apparatus shown in FIG. 2, a tank 19 is divided by a vertical partition 20 into two identical compartments 21 each of which is divided by a horizontal perforated baffle 22 into an upper chamber 23 and a lower chamber 24 having a drain hole 25 controlled by a valve 26. The upper end of the tank 19 is formed with a radial flange 27 to which is secured a flange 28 of a head casting 29 provided with an inlet connection 30 for fluid to be filtered and an outlet connection 31 for filtered fluid. The inlet connection 30 communicates with a restricted nozzle 32 which opens into two parallel fluid passages 33 and 34 separated by a divider 35 forming a continuation of the vertical partition 20, the upstream end of the divider being spaced from and aligned with the nozzle 32. The passages 33 and 34 are separated from the outlet connection 31 by a wall 36 and each communicates through an aperture in the head casting 29 with one of the chambers 23 of the tank 19. The head casting 29 is apertured at opposite sides of the passages 33 and 34 to receive cylindrical filter elements 37 and 38 each of which projects into one of the chambers 23 in the tank 19 and is provided with a flange 39 surrounding its open upper end and clamped between the rim 40 of the associated aperture in the head casting 29 and the depending portions 41 of one of two lids 42 bolted to the top of the casting 29. The upper ends of the filter elements 37 and 38 communicate with circumferential channels 43 and 44 formed in the head casting 29 and communicating with the outlet connection 31. Deflectors 45 secured to opposite sides of the partition 20 beneath the apertures in the head casting 29 connecting the passages 33 and 34 to the chambers 34 serve to deflect fluid flowing into the chambers 23 towards the filter elements 37 and 38.

In operation, fluid to be filtered flows through the inlet connection 30 and nozzle 32 into the passage 33 or 34 on one or other side of the divider 35. The initial direction taken by the fluid is arbitrary, but for the purposes of illustration it is assumed that it first flows through the passage 33 and in FIG. 2 the path of the dirty fluid is indicated by the speckled arrows and that taken by the clean fluid is indicated by the plain arrows.

As will be seen from FIG. 2 the dirty fluid flows through the passage 33 in the head casting 29 and then flows downwardly into the chamber 23 of the nearer of the two compartments 21 of the tank 19. Aided by the deflector plate 45 the fluid then flows through the perforated wall of the filter element 37 into the interior of the element leaving dirt or other foreign matter entrained therein on the outer wall of the element. From the upper end of the element 37 the clean fluid flows through the channel 43 in the head casting 29 to the outlet connection 31. Since the outlet connection 31 opens substantially at right angles to the channel 43 and since the fluid flowing from the nozzle 32 into the passage 33 creates a degree of suction at the upstream end of the passage 34, a small proportion of the clean fluid flowing through the channel 43 passes directly into the channel 44 from whence it flows into the filter element 38 through its upper end and out into the chamber 23 of the farther of the two compartments 21 through the filter wall, dislodging foreign matter therefrom. Due to the relatively low velocity of the fluid flowing back through the chamber 23 containing the inoperative filter element 38, most of the foreign matter dislodged from said filter element falls through the associated baffle 22 into the chamber 24 below, in which it is prevented by the baffle from becoming entrained in the fluid flowing through the chamber 23 above and from which it can be drained by opening the appropriate valve 26. The remainder of the foreign matter dislodged from the filter element 38 is carried by the fluid out of the chamber 23 into the passage 34 and thence to the upstream end of the divider 35 where it joins the stream of fluid flowing from the nozzle 32 into the passage 33. As the foreign matter builds up on the outer wall of the filter element 37 the pressure in the chamber 23 containing the filter element and in the passage 33 increases until the flow of fluid through the nozzle 32 automatically switches to the passage 34 from whence it flows through the chamber 23 containing the clean filter element 38, the filter element 38 itself and the channel 44 to the outlet connections 31. At the same time a small proportion of the clean fluid flows back through the channel 43 and filter element 37, dislodging foreign matter adhering to the outer wall thereof, and returns to the stream of fluid to be filtered through the chamber 23 containing the filter element 37, and the passage 33. The pressure in the passage 34 and the chamber 23 containing the filter element 38 increases with the buildup of foreign matter on the filter element 38 until the stream of fluid issuing from the nozzle 32 is once again switched to the passage 33 and the cycle is repeated for as long as fluid to be filtered is introduced through the inlet connection 30.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Filter apparatus comprising means defining two fluid passages each containing a filter unit, said passages extending between a common upstream junction which is connected to means defining an inlet for fluid to be filtered, and a common downstream junction which is connected to means defining an outlet for filtered fluid, and the upstream portions of said passages each having parallel outer and inner walls, said outer walls being extended in an upstream direction to define an input nozzle interposed between said inlet and said common upstream junction for issuing a stream of fluid to be filtered into the space bounded by said outer wall extensions and said inner walls being formed by the outer surfaces of a flow divider separating the entries to said passages at a point downstream of and in substantial axial alignment with said nozzle, the arrangement being such that a stream of fluid to be filtered issuing from said input nozzle automatically flows through one of said passages and its associated filter unit to said downstream junction from whence the major proportion of the filtered fluid flows through said outlet and a minor proportion of said fluid returns to said upstream junction through the other of said passages and the inoperative filter unit therein to clean the latter, and the flow of fluid through said passages is periodically switched solely in response to increased pressure difference between said upstream junction and said downstream junction through said temporarily operative filter.

2. Filter apparatus according to claim 1, wherein said downstream junction and said outlet are so arranged that fluid flowing from one to the other undergoes a substantial change of direction.

3. Filter apparatus according to claim 1, wherein said fluid passages comprise separate upstream, intermediate and downstream portions, of which the upstream and downstream portions are formed in a head casting which also provides the fluid inlet and outlet and closes the upper end of a tank divided vertically into two separate compartments constituting said intermediate passage portions and communicating with said upstream and downstream portions directly and through said filter units respectively.

4. Filter apparatus according to claim 3, wherein said filter units comprise open-topped vertical cylinders mounted at their upper ends in said head casting and projecting into said tank compartment.

5. Filter apparatus according to claim 3, wherein each tank compartment is divided by a horizontal perforated baffle into an upper chamber forming one of said intermediate passage portions and a lower chamber formed with valve-controlled drain apertures.

* * * * *